(12) United States Patent
Fairy

(10) Patent No.: US 7,527,490 B2
(45) Date of Patent: May 5, 2009

(54) COINJECTION MOLDING APPARATUS AND RELATED HOT-RUNNER NOZZLE

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 245 days.

(21) Appl. No.: 11/549,365

(22) Filed: Oct. 13, 2006

(65) Prior Publication Data

US 2008/0089975 A1    Apr. 17, 2008

(51) Int. Cl.
B29C 45/23    (2006.01)

(52) U.S. Cl. .................. 425/130; 425/564; 425/566

(58) Field of Classification Search .......... 425/562, 425/563, 564, 565, 566, 130
See application file for complete search history.

(56) References Cited

U.S. PATENT DOCUMENTS

| | | |
|---|---|---|
| 3,947,175 A | 3/1976 | Melcher |
| 3,947,177 A | 3/1976 | Eckardt |
| 4,117,955 A | 10/1978 | Sokolow |
| 4,470,936 A | 9/1984 | Potter |
| 4,512,730 A * | 4/1985 | Kudert et al. ............... 425/130 |
| 4,657,496 A | 4/1987 | Ozeki et al. |
| 4,803,031 A | 2/1989 | Ochs et al. |
| 4,917,594 A | 4/1990 | Gellert et al. |
| 5,030,076 A | 7/1991 | Ebenhofer et al. |
| 5,125,817 A | 6/1992 | Yamachika |
| 5,151,278 A | 9/1992 | Baxi et al. |
| 5,164,200 A | 11/1992 | Johnson |
| 5,167,896 A | 12/1992 | Hirota et al. |
| 5,200,207 A | 4/1993 | Akselrud et al. |
| 5,238,378 A | 8/1993 | Gellert |
| 5,286,184 A | 2/1994 | Nakayama |
| 5,780,125 A | 7/1998 | Takeuchi et al. |
| 6,332,767 B1 | 12/2001 | Kudert et al. |
| 6,349,886 B1 | 2/2002 | Bouti |
| 6,974,556 B2 | 12/2005 | Bemis et al. |

(Continued)

FOREIGN PATENT DOCUMENTS

AT    391833 B    12/1990

(Continued)

OTHER PUBLICATIONS

Search Report for European Application 07 019 728.0 mailed Mar. 7, 2008.

(Continued)

*Primary Examiner*—Tim Heitbrink
(74) *Attorney, Agent, or Firm*—McDonnell Boehnen Hulbert & Berghoff LLP

(57) ABSTRACT

A coinjection molding apparatus includes a manifold, a nozzle body coupled to the manifold, a sleeve disposed within the nozzle body and defining an outer melt channel between the sleeve and the nozzle body, a pin disposed within the sleeve and defining an inner melt channel between the pin and the sleeve, and a nozzle tip having an alignment portion contacting the sleeve. The sleeve is actuated to open and close melt communication of the outer melt channel and a cavity gate. The pin is actuated to open and close melt communication of the inner melt channel and an opening of the sleeve. The alignment portion aligns the sleeve with the cavity gate along the actuated range of the sleeve.

28 Claims, 10 Drawing Sheets

U.S. PATENT DOCUMENTS

| | | |
|---|---|---|
| 2004/0091569 A1 | 5/2004 | Babin |
| 2004/0109916 A1 | 6/2004 | Babin |
| 2004/0161490 A1 | 8/2004 | Babin et al. |
| 2005/0248056 A1 | 11/2005 | Canevese et al. |
| 2006/0003039 A1 | 1/2006 | Bouti |
| 2006/0017199 A1 | 1/2006 | Bouti |
| 2006/0018993 A1 | 1/2006 | Fairy |
| 2006/0097083 A1 | 5/2006 | Hofstetter et al. |

FOREIGN PATENT DOCUMENTS

| | | |
|---|---|---|
| CA | 2201415 A1 | 4/1997 |
| DE | 2342957 A1 | 3/1975 |
| DE | 3519921 A1 | 4/1985 |
| DE | 29617531 U1 | 10/1996 |
| DE | 19649467 A1 | 6/1998 |
| DE | 19757411 C1 | 10/1999 |
| EP | 392645 A3 | 4/1990 |
| EP | 392645 B1 | 4/1990 |
| EP | 579925 A1 | 1/1994 |
| EP | 579925 B2 | 1/1994 |
| EP | 0614743 A1 | 9/1994 |
| EP | 1602466 A1 | 12/2005 |
| JP | 62164515 A | 7/1987 |
| JP | 4071813 A | 3/1992 |
| JP | 4084654 A | 3/1992 |
| JP | 5104580 A | 4/1993 |
| JP | 6170888 A | 6/1994 |
| JP | 7164484 A | 6/1995 |
| JP | 7314498 A | 12/1995 |
| JP | 9295327 A | 11/1997 |
| KR | 149202 | 10/1998 |
| WO | WO 99/59795 A1 | 5/1999 |
| WO | WO 2004/071742 A1 | 2/2004 |

OTHER PUBLICATIONS

Document No. XP000933347—cited in Search Report for European Application 07 019 728.0, date unknown.

Ewikon Brochure, date unknown.

HRS Tool and Mould Making, tool-moldmaking.com, Jun. 2006.

* cited by examiner

COINJECTION MOLDING APPARATUS AND RELATED HOT-RUNNER NOZZLE

FIELD OF THE INVENTION

This invention relates generally to an injection molding apparatus, and more particularly to a hot-runner coinjection molding apparatus and related nozzle that control flow of different molding materials through a gate and into a cavity.

BACKGROUND OF THE INVENTION

It is well known in the art to co-inject different plastic melts at the same time, and it is also known to sequentially inject different melts one after the other.

In the past, control of the flow of two or more fluids through a gate and into a cavity has been provided by rotating a valve pin member to align different fluid channels or by axially reciprocating a valve pin member and one or more valve sleeve members, which surround the valve pin member, between retracted open and forward closed positions. For example, a valve pin member can be rotated between different positions to provide coinjection or sequential injection molding.

A valve pin member and valve sleeve member can be axially reciprocated to provide coinjection or sequential injection of at least two different melts, although this is not without its problems, such as inaccuracies in reciprocating movement, difficulties in keeping the different melts adequately separated, and the problems of simplifying manufacture, assembly, and operation of the apparatus. Another problem is that it is difficult to align a valve sleeve member or a valve pin member with a cavity gate, such aligning being important for improving injection technique and reducing gate wear.

BRIEF SUMMARY OF THE INVENTION

According to an embodiment of the present invention, a coinjection molding apparatus includes a manifold, a nozzle body coupled to the manifold, a sleeve disposed within the nozzle body and defining an outer melt channel between the sleeve and the nozzle body, a pin disposed within the sleeve and defining an inner melt channel between the pin and the sleeve, and a nozzle tip having an alignment portion contacting the sleeve. The sleeve is actuated to open and close melt communication of the outer melt channel and a cavity gate. The pin is actuated to open and close melt communication of the inner melt channel and an opening of the sleeve. The alignment portion aligns the sleeve with the cavity gate along the actuated range of the sleeve.

BRIEF DESCRIPTION OF THE FIGURES

Embodiments of the present invention will now be described more fully with reference to the accompanying drawings in which.

DETAILED DESCRIPTION OF THE INVENTION

Figure 1:
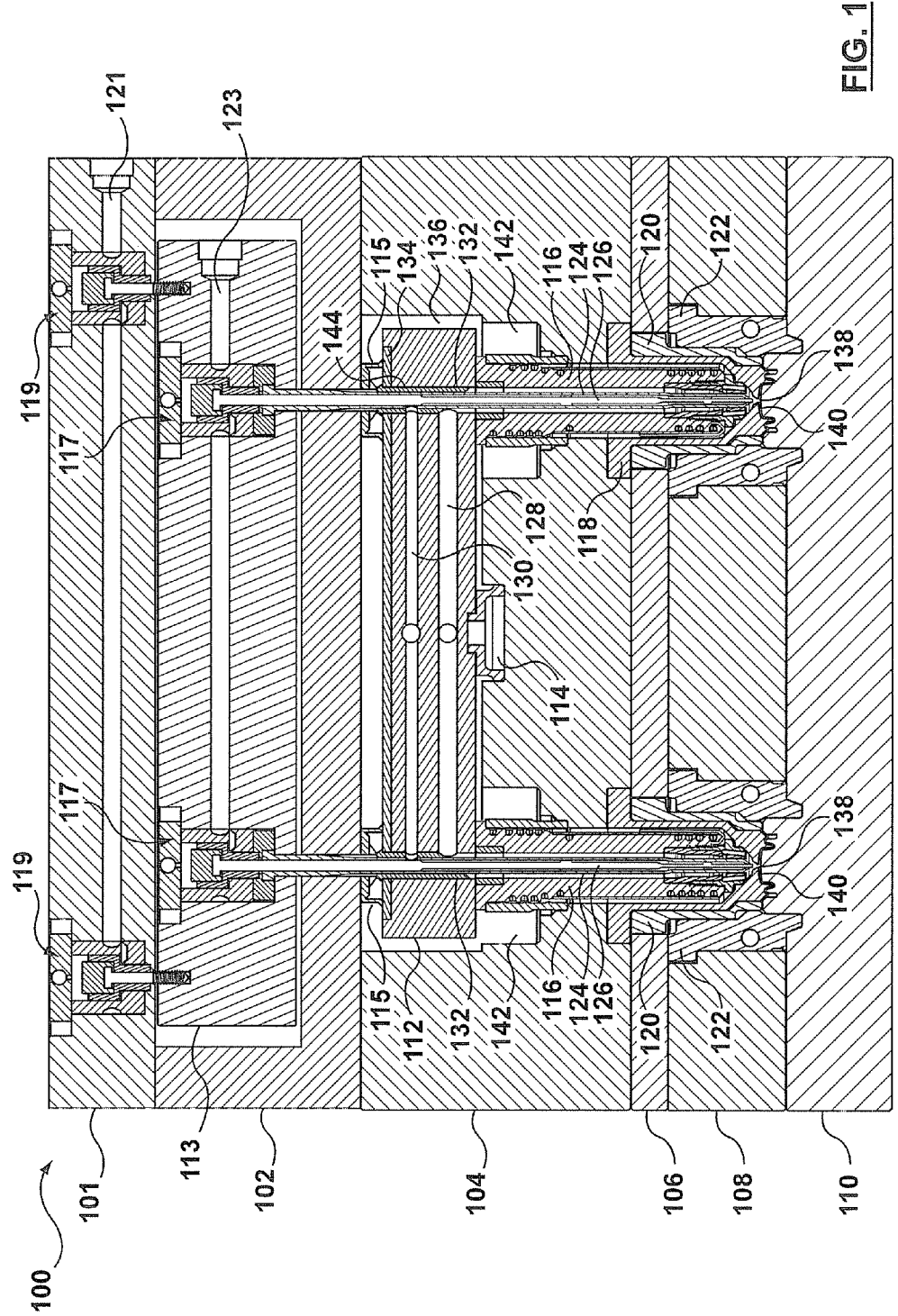
FIG. 1 is a sectional view of an injection molding apparatus according to the invention.

FIG. 1 shows a sectional view of a coinjection molding apparatus 100. The coinjection molding apparatus 100 comprises a backing plate 101, mold plates 102, 104, 106, 108, a cavity plate 110, a yoke plate 113, and a manifold 112. The backing plate 101, mold plates 102, 104, 106, 108, and cavity plate 110 are stacked. The yoke plate 113 is surrounded by the mold plate 102 and the backing plate 101. The manifold is located on the mold plate 104 by a locating ring 114 and separated from the mold plate 102 by valve discs 115. The coinjection molding apparatus 100 further comprises a pair of nozzles 116, each corresponding to a mold insert 118, a second mold insert 120, and a third mold insert 122, which are disposed within the mold plates 106, 108. Each nozzle 116 is adapted to receive a sleeve 124 and a pin 126 (not hatched in the figures). Disposed in the yoke plate 113 are two actuators 117, each for actuating the pin 126 of the respective nozzle 116. Disposed in the backing plate 101 are two actuators 119 for actuating the yoke plate 113, in which the tops of the sleeves 124 are fixed. The backing plate 101 comprises at least a fluid channel 121 for feeding the attached actuators 119, and the yoke plate 113 comprises at least a fluid channel 123 for feeding the attached actuators 117.

In the coinjection molding apparatus 100, two nozzles 116 and two sets of related components merely serve as an example, and more or fewer nozzles and sets of related components could readily be used without altering the principles of the invention. Moreover, the backing plate 101, mold plates 102, 104, 106, 108, and cavity plate 110 are shown as an example. More or fewer plates could be used, depending on specific applications. The number of plates, kinds of plates, and the materials of which the plates are made are not central to the invention. Equally, the mold insert 118, the second mold insert 120, and the third mold insert 122 are also exemplary. Other embodiments can have more or fewer of these components, and one embodiment may not have any, instead simply having a well in a mold plate.

In the following, the direction of molding material flow from the manifold 112 to the cavity plate 110 is known as downstream, while the opposite direction is known as upstream. Forward means the direction from the backing plate 101 to the cavity plate 110 and rearward means the opposite direction. However, the orientation, geometry, and structure of the coinjection molding apparatus 100 are not limited by these terms.

Disposed among the mold plates 102, 104 is the manifold 112, which comprises a first manifold melt channel 128, a second manifold melt channel 130, and guide bores 132 in which are disposed bevel-ended valve disc spigots 144 of the valve discs 115. The manifold melt channels 128, 130 are independent and do not communicate with each other, such that different melts or resins or other molding materials do not mix in the manifold 112. The manifold melt channels 128, 130 are fed by one or more sprues (not shown) connected to one or more molding machines (not shown) or other molding material sources. The lengths, diameters or widths, and general geometry of the manifold melt channels 128, 130 depend on the specific application and the amounts and natures of the molding materials. In this embodiment, both manifold melt channels 128, 130 are cylindrical bores and the first manifold melt channel 128 is of a larger diameter than the second manifold melt channel 130, although other melt channel shapes and sizes are equally suitable. It is known to make manifolds out of a single plate, a group of plates (with different melt channels in different plates), piping or tubing, and modular bars, and the manifold 112 could equally be any of these kinds of manifolds. For example, in another embodiment the manifold 112 can comprise two separate plates, each having one of the manifold melt channels 128, 130 therein. In addition, the manifold 112 may be is provided with a heater 134. Generally, when used as part of a hot-runner application, the manifold 112 is heated and separated from the surrounding mold plates by an insulating air space 136.

In this embodiment, the mold inserts 118, 120, 122 are cavity-forming inserts and each mold insert 118 comprises a cavity gate 138. The mold inserts 118, 120, 122 partially define a mold cavity 140 that is fed by the cavity gate 138 and in which molding material is solidified to form an injection molded product (not shown). The mold insert 122 has cooling channels for circulating cooling fluid to assist in solidifying the molding material in the mold cavity 140. In other embodiments, the mold inserts 118, 120, 122 could be replaced by a gate insert or other known type of insert that does not typically form a substantial part of a mold cavity. In still other embodiments, the mold inserts 118, 120, 122 need not be provided, with the mold plate 108 having a cavity gate instead.

The cavity plate 110, which is illustrated in simplified form for ease of illustration, also partially defines the cavity 140. The cavity plate 110 can be retracted when the molding material injected into the cavity 140 solidifies so that the molded product can be ejected, typically by ejector pins, a stripper plate, or the like (not shown).

Figure 2:
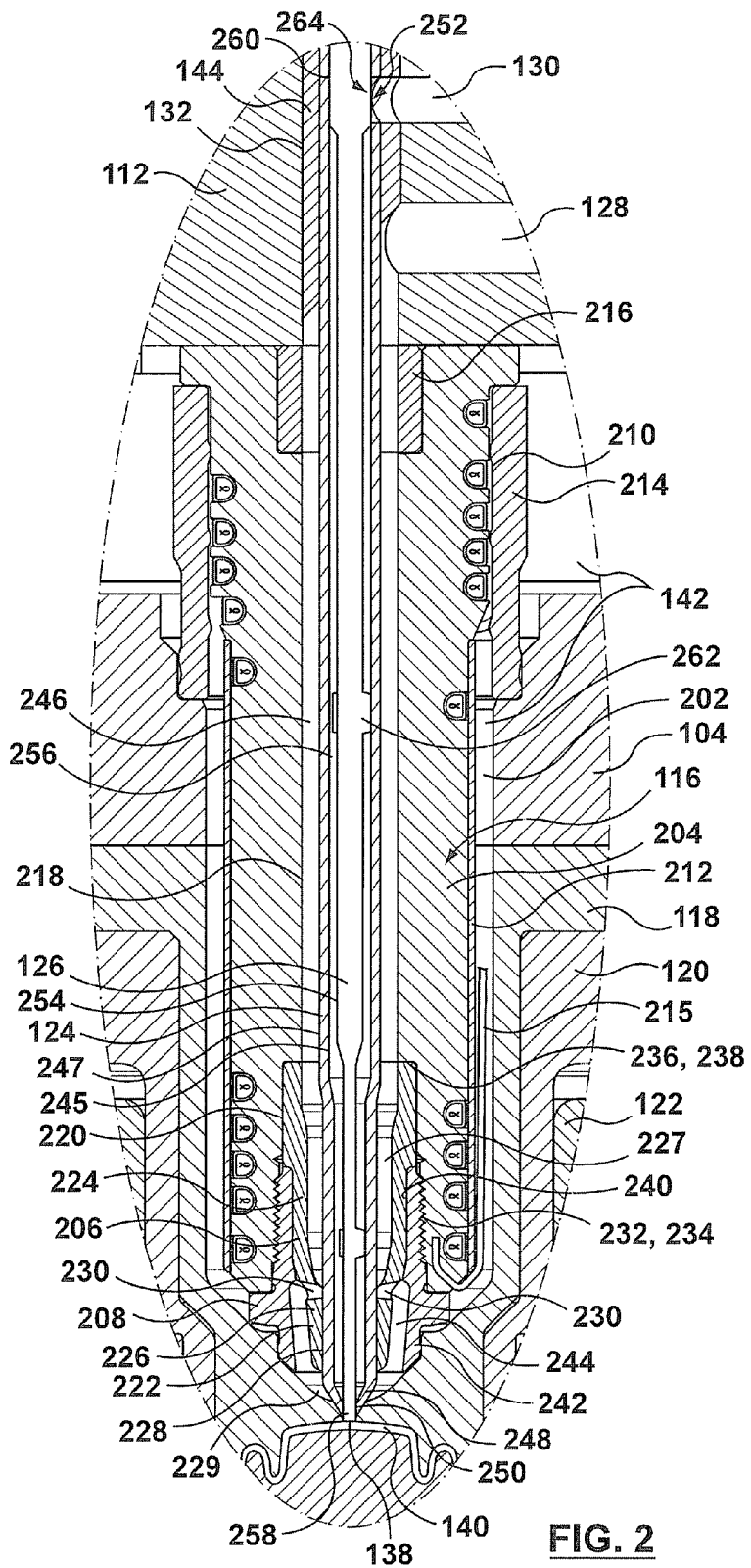
FIG. 2 is a sectional view of mainly the nozzle of FIG. 1.

Coupled to the manifold 112 are the nozzles 116, each of which is disposed in a well 142 of the mold plate 104. As shown in the sectional view of FIG. 2, the well 142 is larger than the nozzle 116 such that an insulating air space 202 is created around the nozzle 116, so that heat in the nozzle 116 is not readily lost to the mold plate 104. The nozzle 116 comprises a nozzle body 204, a nozzle tip 206, and a tip retaining piece 208 that connects the nozzle tip 206 to the nozzle body 204. The nozzle 116 further comprises a spirally wound heater 210 (e.g., an electric heater) having varying pitch and embedded in the nozzle body 204 from the head to the area of the nozzle tip 206. A nozzle flange 214 is provided at the head of the nozzle body 204 and serves to support the nozzle 116 in the mold plate 104. The nozzle flange 214 is disposed in the well 142. The heater 210 is covered by a cover 212 (e.g., a plate or coating) and the nozzle flange 214, which both surround the nozzle body 204. To measure the temperature of the nozzle 116 or molding material therein, a thermocouple 215 may be situated inside a thermocouple well. Additionally, a nozzle seal 216 is provided at the head of the nozzle 116 to seal the connection of the nozzle 116 and the manifold 112.

The nozzle body 204 is generally cylindrical and comprises a longitudinal bore 218, which is also generally cylindrical. The longitudinal bore 218 of the nozzle 116 is aligned with the guide bore 132 of the manifold 112.

The nozzle tip 206 is disposed in a frontal bore 220 of the nozzle body 204 and comprises an alignment portion 222. The nozzle tip 206 can be viewed as having two tubular portions, a first tubular portion 224 and a second tubular portion 226 downstream of the first tubular portion 224. The first and second tubular portions 224, 226 can have cylindrical, conical, curved, or irregular shapes, provided that the second tubular portion 226 is of generally smaller inner diameter than the first tubular portion 224. In this embodiment, the first and second tubular portions 224, 226 are generally cylindrical. The definition of the nozzle tip 206 as having two tubular potions 224, 226 does not mean that the nozzle tip 206 must be made of two pieces; it is merely a convenient way of viewing the nozzle tip 206. The nozzle tip 206 can be made of a single piece or multiple pieces. The nozzle tip 206 has a nozzle tip melt channel 227 in communication with the longitudinal bore 218 of the nozzle body 204. The nozzle tip 206 is set back from the mold insert 118 such that a forward melt area 229 exists.

In this embodiment, the alignment portion 222, which corresponds to the second tubular portion 226, has an alignment bore 228, which can be considered the inner diameter of the second tubular portion 226. The nozzle tip 206 further comprises a plurality of release melt channels 230 disposed upstream of the alignment portion 222 or between the second tubular portion 226 and the first tubular portion 224, with one release melt channel 230 being the minimum number required and the maximum simply limited by geometry, molding material, and the desired structural integrity of the nozzle tip 206. Each release channel 230 can be said to be lateral in that it allows molding material to flow sideways relative to the general flow of molding material in the nozzle tip 206. Each release melt channel 230 can be a bore, a slit, a hole, an opening, or any other type of channel structure. The plurality of release melt channels 230 may be of different shapes or of the same shape.

The tip retaining piece 208 has threads 232 that are mated into corresponding threads 234 of the nozzle body 204, and in this way retains the nozzle tip 206 in the nozzle body 204. The retaining is assisted by a concave shoulder 236 in the nozzle body 204 and a corresponding convex shoulder 238 on the nozzle tip 206 and by the shape of the contact area 240 between the corresponding surfaces of the nozzle tip 206 and the tip retaining piece 208. Other coupling schemes, such as brazing, could also be used. The tip retaining piece 208 further comprises a sealing portion 242 that fits or seals against the mold insert 118 and prevents molding material from entering the insulating air space 202.

An annular melt channel 244 exists between the tip retaining piece 208 and the alignment portion 222 of the nozzle tip 206, the annular melt channel 244 circumferentially surrounding a portion of the nozzle tip 206 that is downstream of the release melt channels 230. The one or more release melt channels 230 provide molding material communication between the nozzle tip melt channel 227 and the annular melt channel 244. The annular melt channel 244 communicates molding material from the release melt channels 230 to the forward melt area 229, which can communicate with the cavity gate 138.

Running through the manifold 112 and the nozzle 116 are the sleeve 124 and the pin 126 disposed within the sleeve 124. The sleeve 124 is sometimes known as a sleeve pin, and the pin 126 is sometimes called a valve pin or a needle.

The sleeve 124 is disposed within the guide bore 132 of the manifold 112, the longitudinal bore 218 of the nozzle body 204, and the nozzle tip melt channel 227 of the nozzle tip 206. The sleeve 124 has a hollow section 245 and a section 247 narrower than the guide bore 132, the longitudinal bore 218, and the nozzle tip melt channel 227, thus defining an outer melt channel 246 between the sleeve 124 and the nozzle body 204 as well as between the sleeve 124 and the manifold 112 and nozzle tip 206. In this embodiment, the hollow section 245 and the narrower section 247 both span from the first manifold melt channel 128 to the cavity gate 138. The sleeve 124 can have stepped diameters, such that the sleeve 124 is narrower at the nozzle tip 206 than at the yoke plate 113. The outer melt channel 246 communicates with the first manifold melt channel 128. In this embodiment, the outer melt channel 246 has an annular cross-section. The sleeve 124 has a tip portion 248 and an opening 250 in the tip portion 248. In this embodiment the tip portion 248 is a narrowed or pointed section of the sleeve 124 and the opening 250 is a central opening in such narrowed section. The sleeve 124 is slidably disposed in the valve disc spigot 144 in the guide bore 132, and the sleeve 124 can slide or reciprocate to open and close melt communication of the outer melt channel 246 to the cavity gate 138 with the tip portion 248. As such, the sleeve 124 can be said to have opened and closed positions. The sleeve 124 also has a lateral opening 252 near the second manifold melt channel 130, and the valve disc spigot 144 has an opening corresponding to the lateral opening 252.

The alignment portion 222, and more specifically in this embodiment, the alignment bore 228 of the nozzle tip 206 aligns or guides the sleeve 124 over the sliding range of movement of the sleeve 124 to prevent lateral deflection of sleeve 124 during sliding. In this embodiment, alignment means in a straight line. However, in other embodiments, alignment may mean to be in communication with. This aligning or guiding function of the alignment portion 222 (alignment bore 228) can reduce wear of the cavity gate 138 caused by the sleeve 124 and can further improve injection technique. The alignment bore 228 can also prevent resistance against movement of the sleeve 124. Additionally, an inside surface of the alignment bore 228 can be coated with a coating that aids in the movement (a friction-reducing coating), reduces wear to the alignment bore 228 (a wear-resistant coating), and/or improves alignment of the sleeve 124 with respect to the cavity gate 138. The coating can be, but is not limited to, a nickel-based material. The coating can also be implemented to improve the hardness of the alignment portion 222 surface in contact with the sleeve 124. In addition, the fit between sleeve 124 and alignment bore 228 can be configured to not allow molding material to flow between the sleeve 124 and the alignment bore 228.

In addition, as controlled by the position of the sleeve 124, the nozzle tip 206 distributes molding material from the outer melt channel 246 through release melt channels 230 and to the annular melt channel 244, such that the flow, velocity, and/or pressure of the molding material are balanced. This can result in an even and balanced flow of the molding material.

The pin 126 is disposed within the hollow section 245 of the sleeve 124. The pin 126 has a section 254 narrower than the hollow section 245 of the sleeve 124, thus defining an inner melt channel 256 between the pin 126 and the sleeve 124. The pin 126 can have stepped diameters, such that the pin 126 is narrower at the nozzle tip 206 than at the yoke plate 113. The inner melt channel 256 can communicate with the second manifold melt channel 130. In this embodiment the inner melt channel 256 has an annular cross-section. The pin 126 comprises a tip 258. The pin 126 is slidably disposed in the sleeve 124 by virtue of an upper section 260 that slidably mates with the inner wall of the hollow section 245 of the sleeve 124. The pin 126 can slide or reciprocate to open and close melt communication of the inner melt channel 256 to the opening 250 of the sleeve 124 with the tip 258 of the pin 126. The opened and closed positions of the pin 126 are with respect to the sleeve 124. From the frame of reference of, say, the nozzle body 204, the pin 126 actually has three positions. The pin 126 can further have at least one fin 262 that contacts the inner wall of the hollow section 245 of the sleeve 124 to align the pin 126 within the sleeve 124. In this embodiment, the pin 126 has upstream fins 262 in the vicinity of the nozzle body 204 and downstream fins 262 near the nozzle tip 206.

The lateral opening 252 of the sleeve 124 allows molding material to flow from the second manifold melt channel 130 to the inner melt channel 256. Correspondingly, the pin 126 can further comprise a shut-off portion 264, which can be a section of the pin 126 having an outer diameter substantially equally to an inner diameter of the sleeve 124 at the lateral opening 252. The shut-off portion 264 is located so as to obstruct the lateral opening 252 when the pin 126 is in the closed position, and to not obstruct the lateral opening 252 when the pin 126 is in the opened position. The shut-off portion 264 is entirely optional since flow of molding material is also controlled by the tip 258 of the pin 126.

FIGS. 3a-d show in section the possible positions of the sleeve 124 and the pin 126 and the related access of the different molding materials to the cavity 140.

Controlling the sliding or reciprocating of the sleeve 124 and the pin 126 are actuators 119, 117 shown in section in FIGS. 4a-d.

As can be seen in FIGS. 4a-d, the actuators 119 (one not shown) control the position of the yoke plate 113 and each of the actuators 117 (one not shown) control the position of one of the pins 126. The actuator 117 is disposed in a well 402 of the yoke plate 113 and the actuator 119 is disposed in a well 404 of the backing plate 101. Each actuator 117, 119 comprises a cylindrical actuator body 406, a cylinder top 408, a piston 410, and a piston cap 412. The actuator body 406 comprises a circumferential first fluid channel 414 and a second fluid channel 416 for delivering hydraulic fluid from the fluid channel 121 or 123 to the underside of the piston 410 so as to urge the piston 410 rearward. The cylinder top 408 comprises a fluid channel 418 for delivering hydraulic fluid from a fluid source (not shown) to the topside of the piston 410 so as to urge the piston 410 forward. In the actuator 117, the pin 126 is secured between the piston 410 and the piston cap 412. The actuator 119 connects to the yoke plate 113 by a bolt 420 that is threaded into a bolt hole 422 of the yoke plate 113. In the actuator 119, the head of the bolt 420 is secured between the piston 410 and the piston cap 412. The actuators 117, 119 are hydraulic actuators, although pneumatic actuators, electrical actuators, and spring-loaded types of actuators are equally suitable. In addition, the common fluid channel 121 means that actuation of the actuators 119 is synchronized and the common fluid channel 123 means that actuation of the actuators 117 is synchronized. In other embodiments, separate fluid channels can be provided to allow for independent actuation.

Also shown in FIGS. 4a-d is a disc 424 that assists in holding the sleeve 124 to the yoke plate 113, and a gap 426 that exists between the yoke plate 113 and the backing plate 101 when the actuator 119 is in the forward position (as shown). In addition, the various positions of the shut-off portion 264 of the pin 126 and the lateral opening 252 of the sleeve 124 can be seen in FIGS. 4a-d as well.

The possible positions of the sleeve 124 and the pin 126 shown in FIGS. 3a-d directly correspond to the actuator positions shown in FIGS. 4a-d.

Figure 3A:
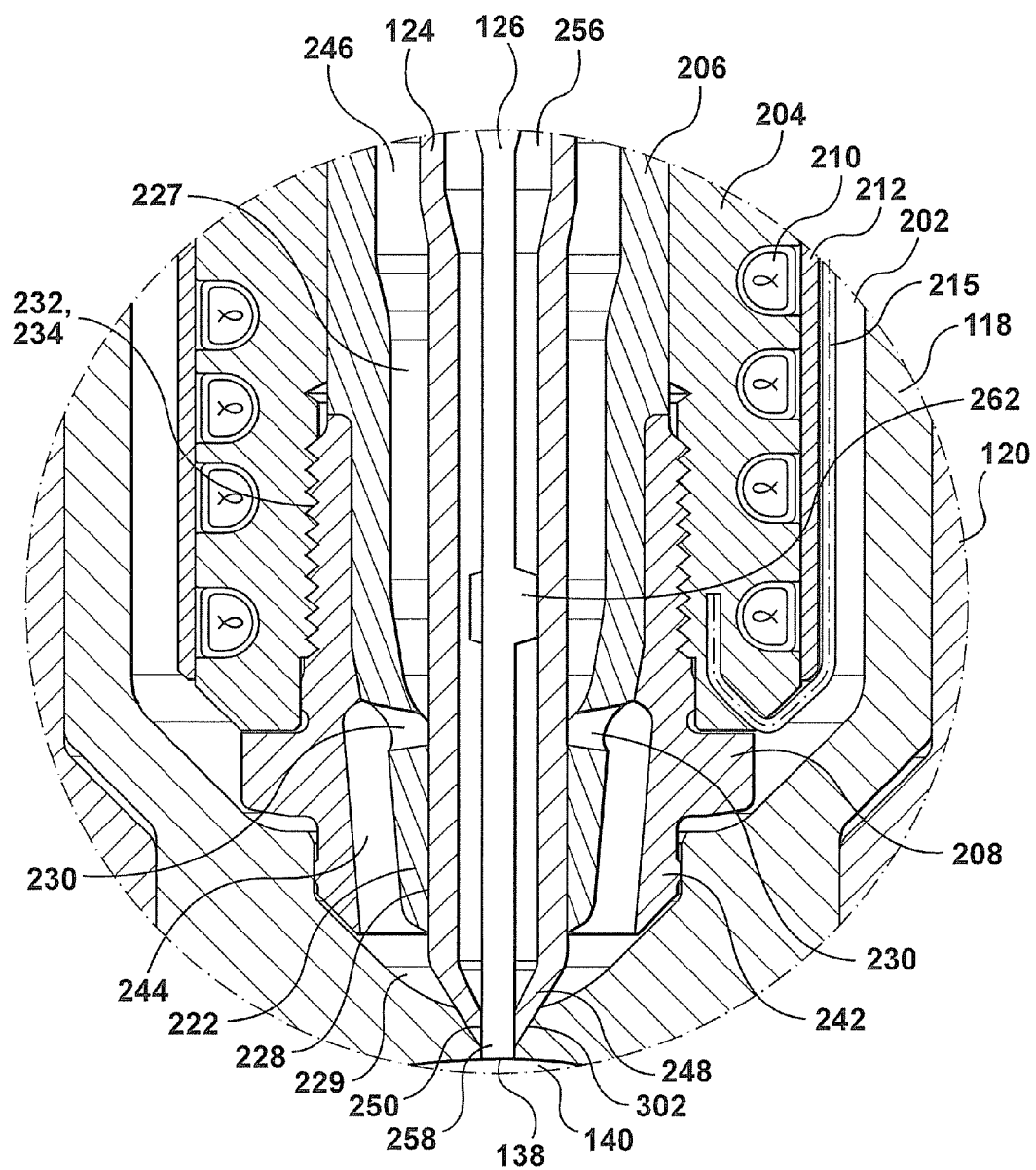
FIGS. 3a-d are sectional views of actuation of the sleeve and the pin of FIG. 1.
Figure 4A:
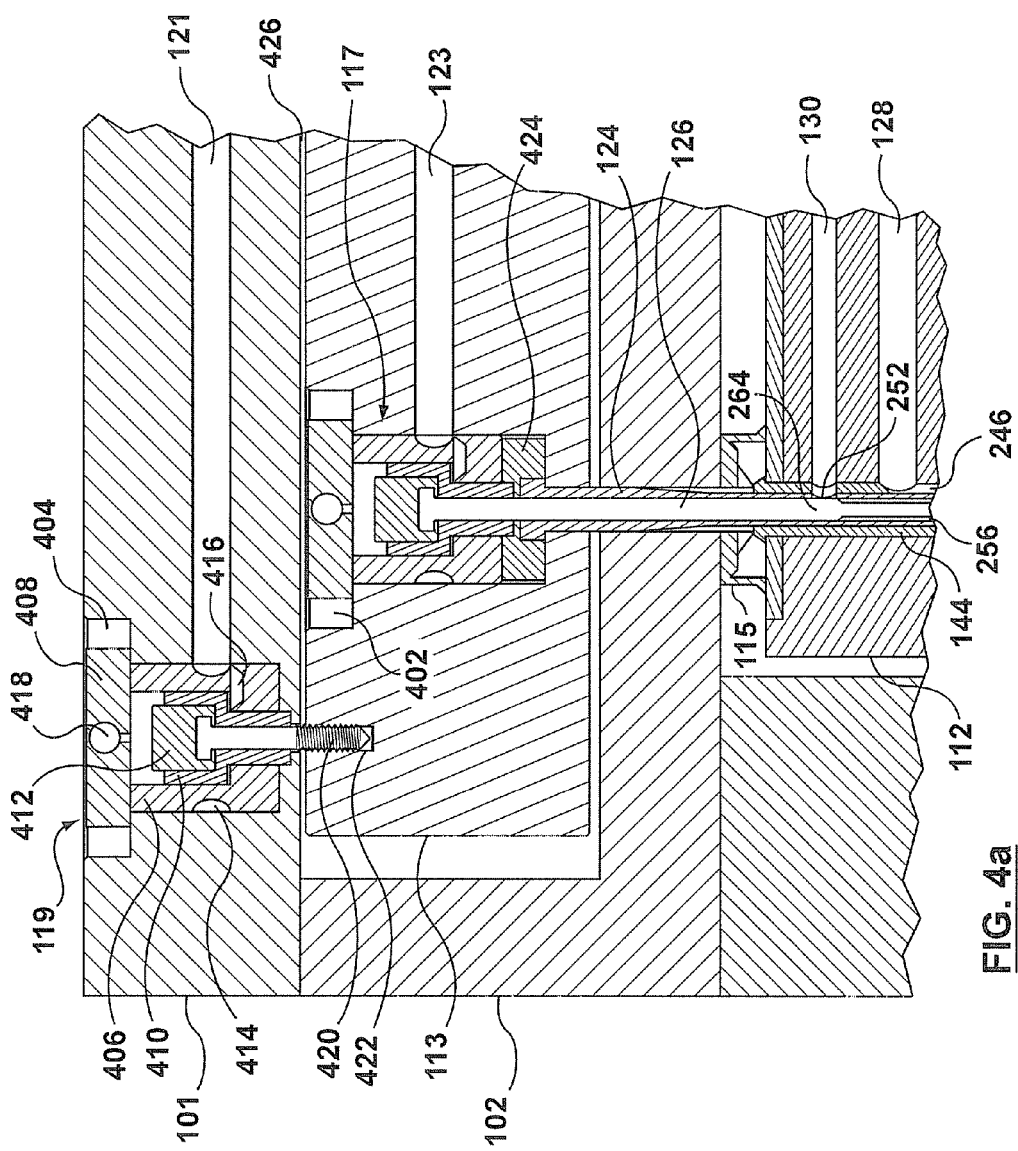
FIGS. 4a-d are sectional views of actuation of the actuators and yoke plate of FIG. 1.

FIG. 3a shows both the sleeve 124 and the pin 126 in their closed positions. As can be seen, the tip portion 248 of the sleeve 124 is disposed in an optional concave recess 302 (e.g., a conical recess) of the mold insert 118. In this way, the tip portion 248 of the sleeve 124 obstructs or closes the cavity gate 138, thereby preventing molding material in the outer melt channel 246 from passing through the cavity gate 138. As for the pin 126, its tip 258 is inserted into the opening 250 of the sleeve 124, thereby closing the opening 250 of the sleeve 124 and preventing molding material present in the inner melt channel 256 from passing through the cavity gate 138. This state of the sleeve 124 and the pin 126 is accomplished by the positions of the actuators 119, 117 as shown in FIG. 4a. Specifically, hydraulic fluid is applied to the fluid channels 418 of the actuators 117, 119 and hydraulic fluid is allowed to withdraw from the fluid channels 414 via the fluid channels 121, 123, so as to urge the yoke plate 113, which has the sleeve 124 attached, forward and urge the pin 126 forward as well.

Figure 3B:
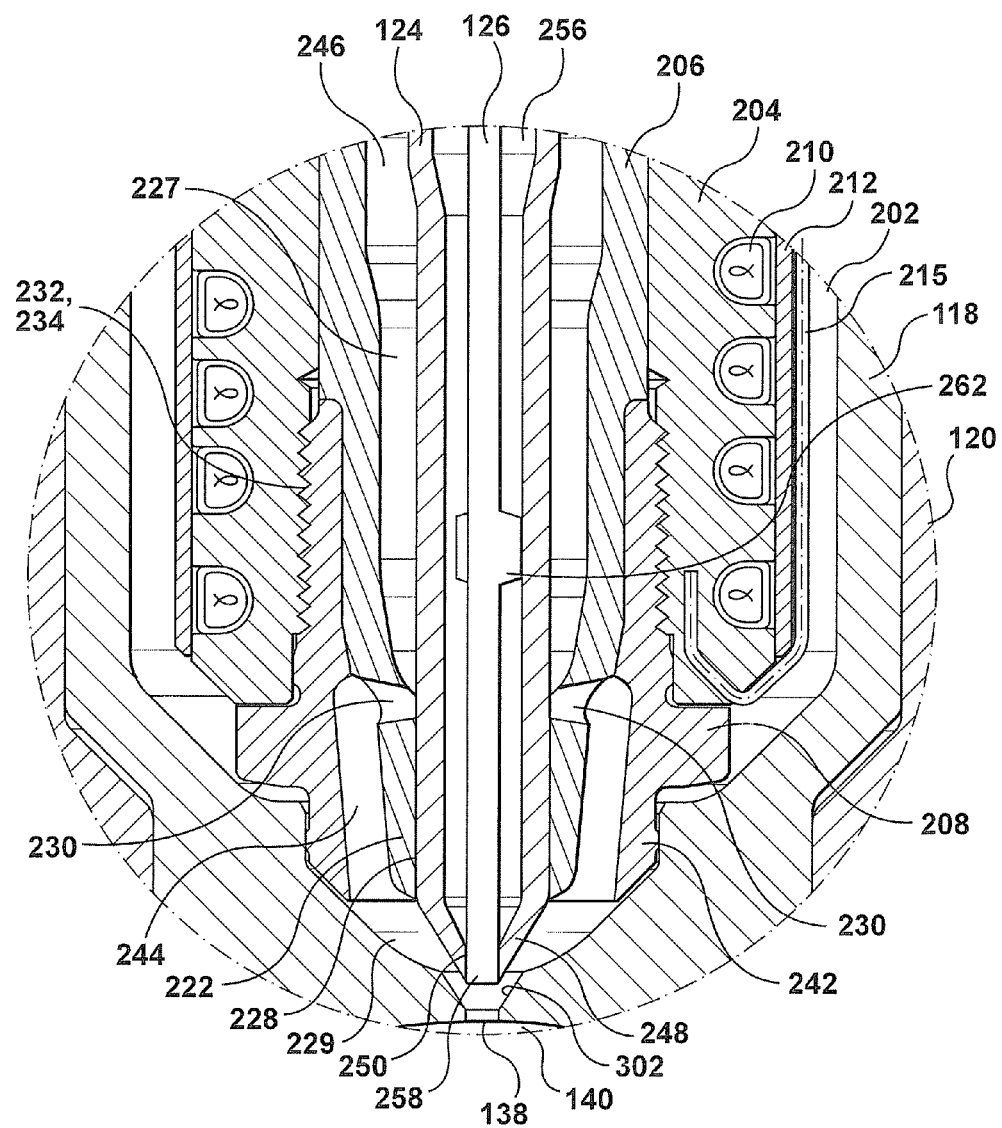
Figure 4B:
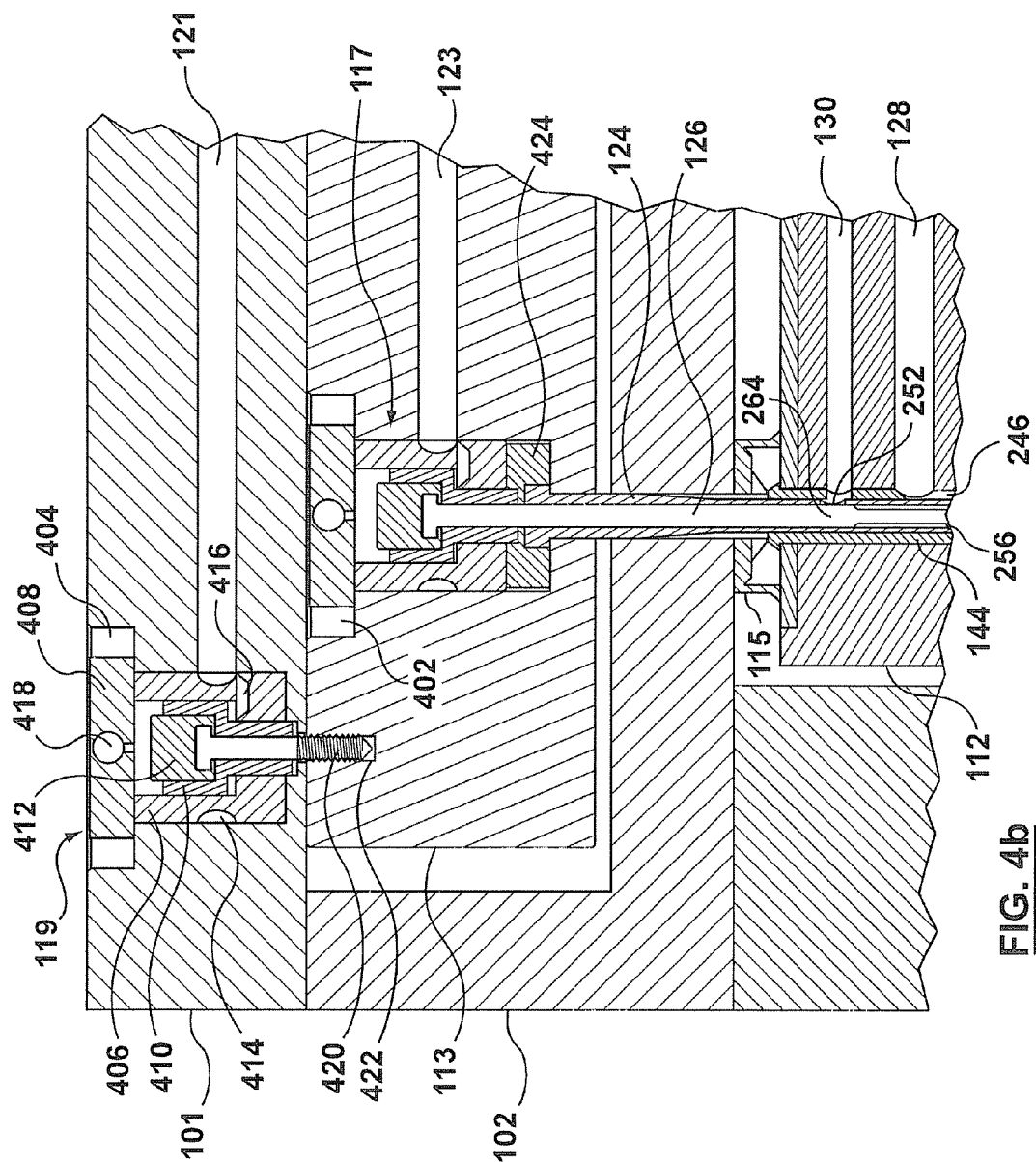

FIG. 3b shows the sleeve 124 in its open position and the pin 126 in its closed position. The sleeve 124 is retracted from the concave recess 302 of the mold insert 118, so that the tip portion 248 of the sleeve 124 allows molding material present in the outer melt channel 246 to pass through the cavity gate 138. While the sleeve 124 is being retracted, the alignment bore 228 keeps the sleeve 124 in alignment with the cavity gate 138. The tip 258 of the pin 126 still closes the opening 250 of the sleeve 124, preventing molding material present in the inner melt channel 256 from passing through the cavity gate 138. Though the position of the pin 126 has not changed relative to the sleeve 124, the pin 126 can be considered retracted relative to the nozzle body 204. This state of the sleeve 124 and the pin 126 is accomplished by the positions of the actuators 119, 117 as shown in FIG. 4b. Specifically, hydraulic fluid is applied to the fluid channel 414 of the actuator 119 via the fluid channel 121 and hydraulic fluid is allowed to withdraw from the fluid channel 418, so as to urge the yoke plate 113 and the attached sleeve 124 rearward. Hydraulic fluid is also applied to the fluid channel 418 of the actuator 117 and hydraulic fluid is allowed to withdraw from the fluid channel 414 via the fluid channel 123, so as to urge the pin 126 forward.

Figure 3C:
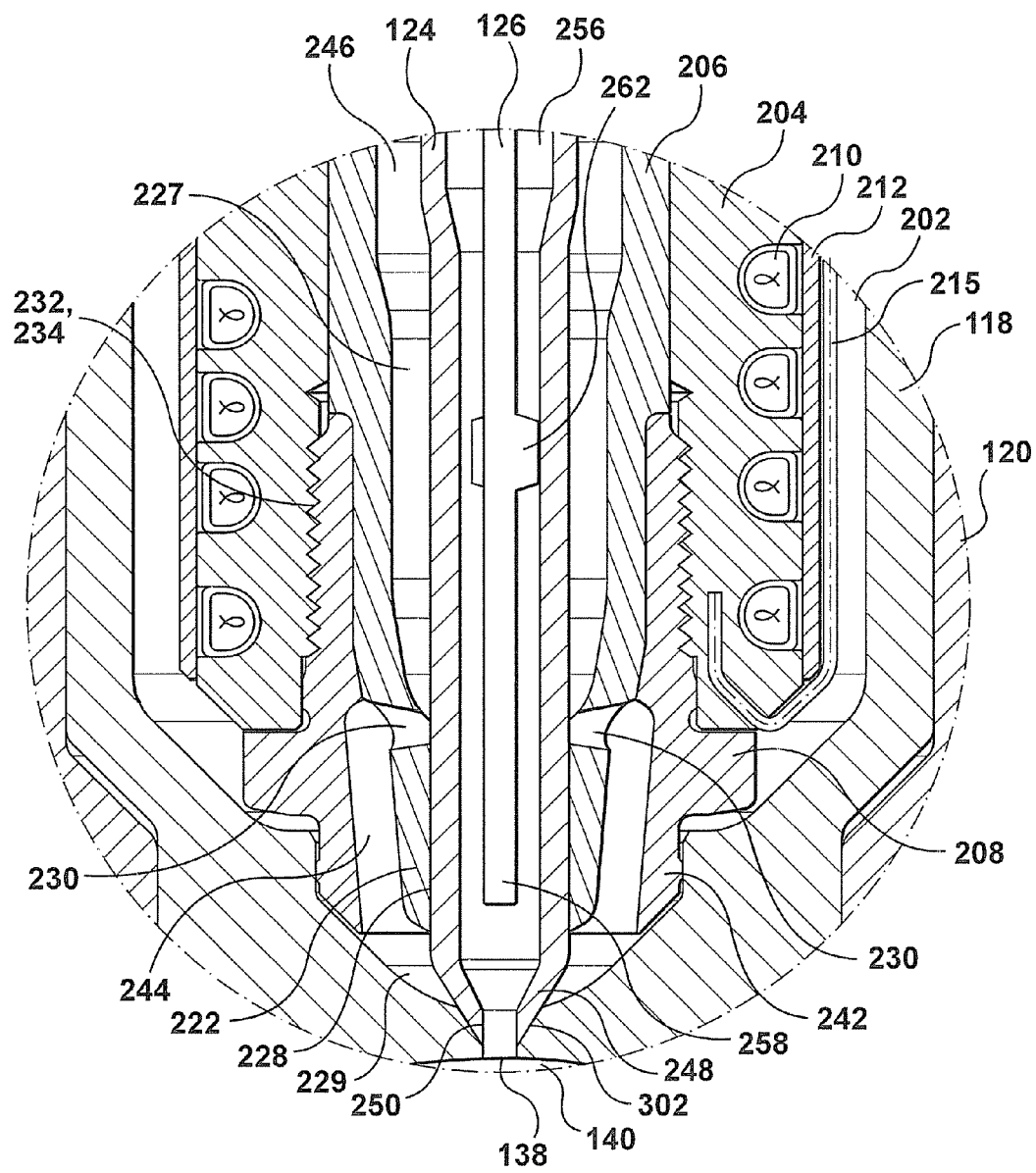
Figure 4C:
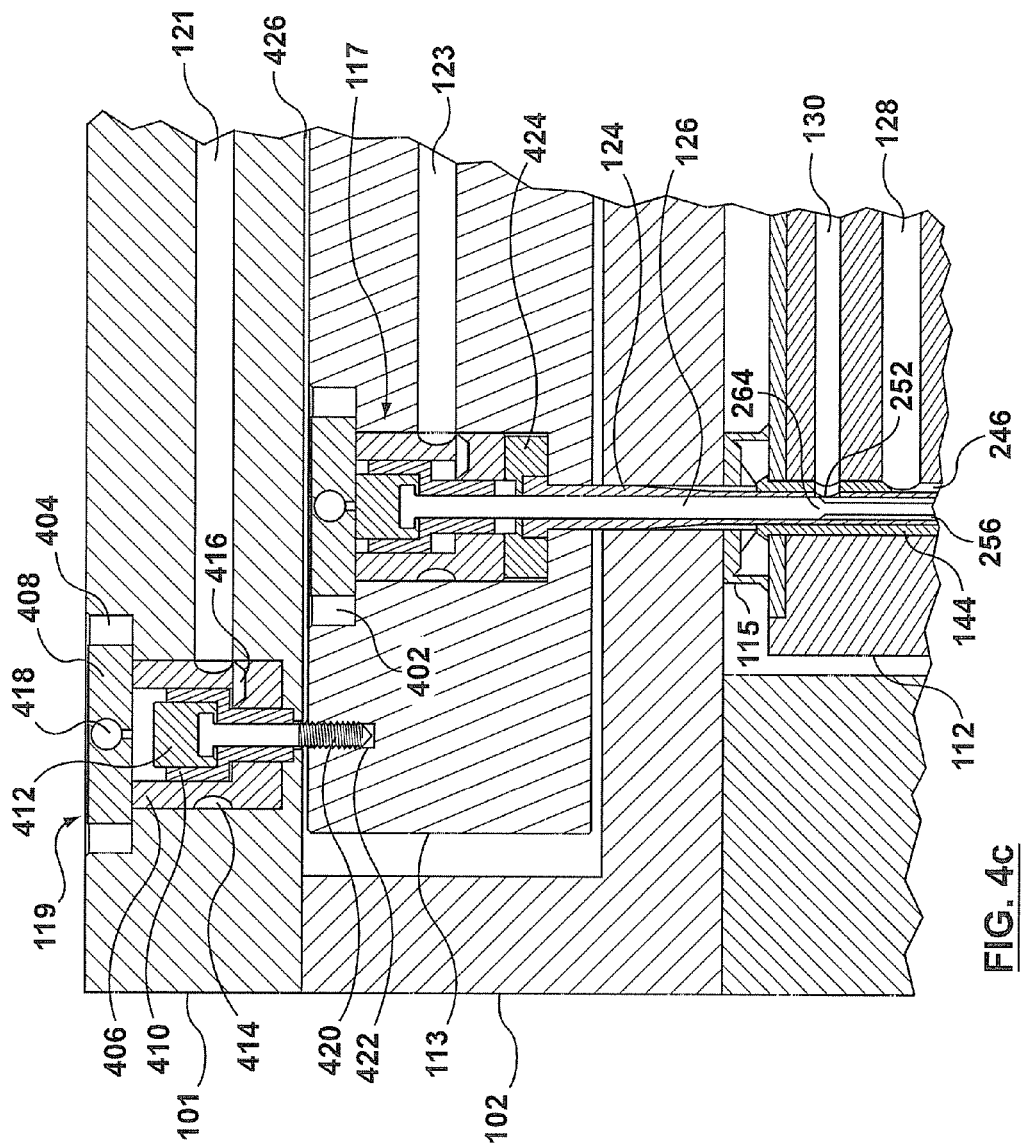

FIG. 3c shows the sleeve 124 in the closed position and the pin 126 in the opened position. The tip portion 248 of the sleeve 124 is moved forward into the concave recess 302 of the mold insert 118. While the sleeve 124 is moved forward, the alignment bore 228 keeps the sleeve in alignment with the cavity gate 138. As such, the tip portion 248 of the sleeve 124 obstructs or closes the cavity gate 138, preventing molding material in the outer melt channel 246 from passing through the cavity gate 138. The pin 126 is retracted from the opening 250 of the sleeve 124 such that the tip 258 of the pin 126 does not obstruct the opening 250 of the sleeve 124 and allows molding material present in the inner melt channel 256 to pass through the cavity gate 138. While the pin 126 is being retracted, the fins 262 keep the pin 126 in alignment with the opening 250 of the sleeve. This state of the sleeve 124 and the pin 126 is accomplished by the positions of the actuators 119, 117 as shown in FIG. 4c. Specifically, hydraulic fluid is applied to the fluid channel 418 of the actuator 119 and allowed to withdraw from the fluid channel 414 via the fluid channel 121, so as to urge the yoke plate 113 and attached sleeve 124 forward. Hydraulic fluid is also applied to the fluid channel 414 of the actuator 117 via the fluid channel 123 and hydraulic fluid is allowed to withdraw from the fluid channel 418, so as to urge the pin 126 rearward.

Figure 3D:
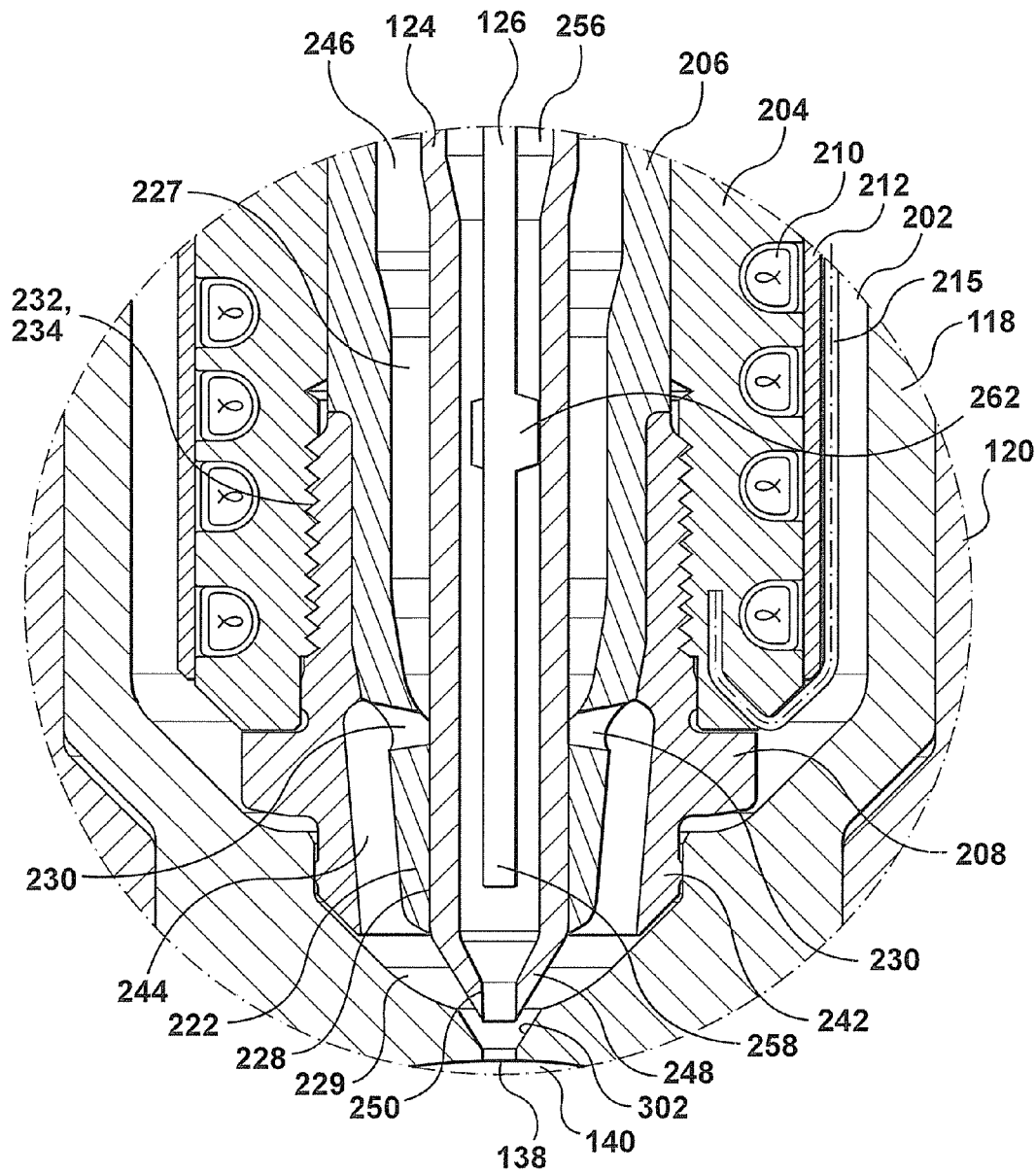
Figure 4D:
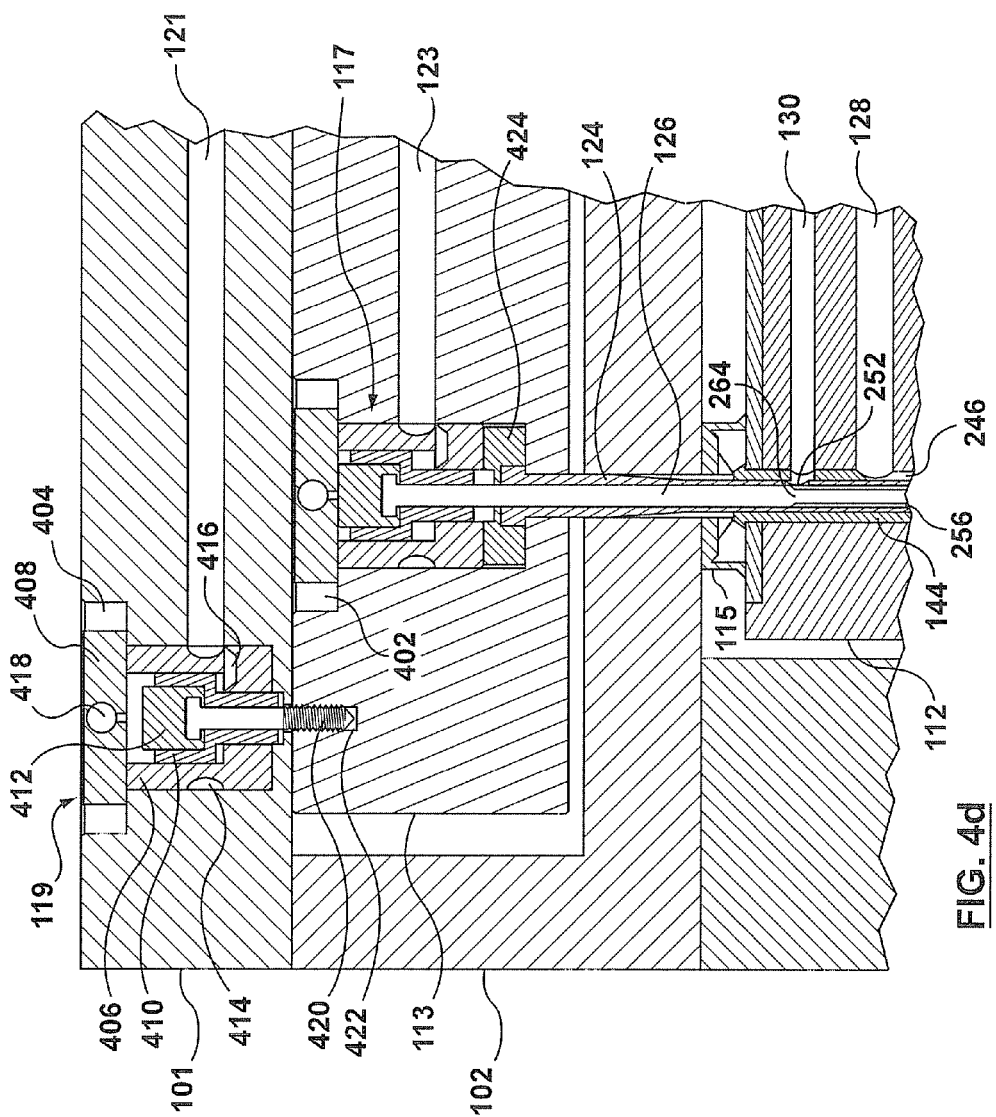

FIG. 3d shows both the sleeve 124 and the pin 126 in their opened positions. The sleeve 124 is retracted from the concave recess 302 of the mold insert 118, and therefore the tip portion 248 of the sleeve 124 allows molding material located in the outer melt channel 246 to pass through the cavity gate 138. Likewise, the pin 126 is retracted from the opening 250 of the sleeve 124 so that the tip 258 of the pin 126 does not obstruct the opening 250 of the sleeve 124, allowing molding material present in the inner melt channel 256 to pass through the cavity gate 138. While the sleeve 124 and the pin 126 are being retracted, the alignment bore 228 and the fins 262 keep the sleeve 124 and the pin 126 in alignment with the cavity gate 138 and the opening 250 of the sleeve 124 respectively. This state of the sleeve 124 and the pin 126 is accomplished by the positions of the actuators 119, 117 as shown in FIG. 4d. Specifically, hydraulic fluid is applied to the fluid channels 414 of the actuators 119, 117 via the fluid channels 121, 123 and hydraulic fluid is allowed to withdraw from the fluid channels 418, so as to urge the yoke plate 113, which has the sleeve 124 attached, rearward and urge the pin 126 rearward as well.

As seen in FIGS. 3a-d, in the range of motion of the sleeve 124 (i.e., between and including the opened and closed positions), the alignment portion 222, and specifically the alignment bore 228, of the nozzle tip 206 continuously aligns the sleeve 124, and in particular the tip portion 248 of the sleeve 124, with the cavity gate 138 and the concave recess 302. Similarly, in the range of motion of the pin 126 (i.e., between and including the opened and closed positions), the fins 262 continuously align the pin 126, and in particular the tip 258 of the pin 126, with the opening 250 of the sleeve 124.

One of the many injection sequences that can be realized with the coordinated movement of the sleeve 124 and the pin 126 is as follows. First, the sleeve 124 is closed, pin 126 is closed, and no molding material flows into the mold cavity 140 (FIG. 3a, FIG. 4a). Second, the sleeve 124 is opened, pin 126 is kept closed, and molding material from the outer melt channel 246 flows into the mold cavity 140 (FIG. 3b, FIG. 4b). Third, the sleeve 124 is closed, the pin 126 is opened, and molding material from the inner melt channel 256 flows into the mold cavity 140 (FIG. 3c, FIG. 4c). Fourth, the sleeve 124 is opened, pin 126 is closed, and again molding material from the outer melt channel 246 flows into the mold cavity 140 (FIG. 3b, FIG. 4b). And fifth, the sleeve 124 is closed, pin 126 is kept closed, and no molding material flows into the mold cavity 140 (FIG. 3a, FIG. 4a). This sequence can be repeated in a molding cycle of steps: first, second, third, fourth, fifth (first), second, third, etc. Such cycle is useful in making multilayered molded products from two different molding materials.

Other actuation schemes can be used in the coinjection molding apparatus 100. Instead of the actuators 119, the yoke plate 113 could instead be moved by a sliding wedge that wedges between the yoke plate 113 and the mold plate 102. The actuator 117 could also be located within the piston of a larger actuator that replaces the actuator 119 and the yoke plate 113. In addition, two independent actuators could be used, with the one that moves the sleeve 124 being a two-position actuator and the one that moves the pin 126 being a three-position actuator.

The coinjection molding apparatus 100 can be made with conventional manufacturing techniques.

Materials for the components of the coinjection molding apparatus 100 are typical, such as steel, tool steel, copper alloy, copper-beryllium, titanium, titanium alloy, ceramic, high-temperature polymer, and similar materials. However, in one embodiment, the tip retaining piece 208 is made of a material that is less thermally conductive than a material of which the nozzle tip 206 is made. For example, the tip retaining piece 208 could be titanium while the nozzle tip 206 could be copper-beryllium alloy, allowing the tip retaining piece 208 to further serve a thermal insulating purpose.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

I claim:

1. A coinjection molding apparatus comprising:
   a manifold comprising a first manifold melt channel, a second manifold melt channel, and a guide bore;
   a nozzle body comprising a longitudinal bore aligned with the guide bore, the nozzle body coupled to the manifold;
   a sleeve disposed within the longitudinal bore, the sleeve comprising a tip portion comprising an opening, and the sleeve having a hollow section and a section narrower than the longitudinal bore thus defining an outer melt channel between the sleeve and the nozzle body, the outer melt channel communicating with the first manifold melt channel, the sleeve slidably disposed in the guide bore to open and close melt communication of the outer melt channel to a cavity gate by the tip portion of the sleeve;

a pin disposed within the hollow section of the sleeve and comprising a tip, the pin having a section narrower than the hollow section of the sleeve thus defining an inner melt channel between the pin and the sleeve, the inner melt channel for communicating with the second manifold melt channel, the pin slidably disposed in the sleeve to open and close melt communication of the inner melt channel to the opening of the sleeve by the tip of the pin; and a nozzle tip coupled to the nozzle body and comprising a nozzle tip melt channel in communication with the longitudinal bore and forming part of the outer melt channel, the nozzle tip further comprising an alignment portion contacting the sleeve, the alignment portion for aligning the tip portion of the sleeve with the cavity gate along the sliding range of the sleeve.

2. A coinjection molding apparatus as claimed in claim 1, wherein the alignment portion comprises an alignment bore through which the sleeve slides.

3. A coinjection molding apparatus as claimed in claim 2, wherein the nozzle tip further comprises a release melt channel upstream of the alignment bore, the release melt channel communicating with the nozzle tip melt channel and an annular melt channel that circumferentially surrounds a portion of the nozzle tip downstream of the release melt channel.

4. A coinjection molding apparatus as claimed in claim 2, wherein an inside surface of the alignment bore comprises a friction-reducing coating or a wear-resistant coating.

5. A coinjection molding apparatus as claimed in claim 1, wherein the nozzle tip comprises a first tubular portion coupled to the nozzle body and that partially defines the outer melt channel, and a second tubular portion that comprises an alignment bore through which the sleeve slides, the second tubular portion having a smaller diameter than the first tubular portion and being located downstream of the first tubular portion.

6. A coinjection molding apparatus as claimed in claim 5 further comprising a release melt channel located between the first tubular portion and the second tubular portion.

7. A coinjection molding apparatus as claimed in claim 1, wherein the nozzle tip further comprises a release melt channel upstream of the alignment portion, the release melt channel communicating with the nozzle tip melt channel and an annular melt channel that circumferentially surrounds a portion of the nozzle tip downstream of the release melt channel.

8. A coinjection molding apparatus as claimed in claim 1 further comprising a tip retaining piece connected to the nozzle body and retaining the nozzle tip with respect to the nozzle body.

9. A coinjection molding apparatus as claimed in claim 8, wherein the tip retaining piece comprises a sealing portion that contacts a mold insert or a mold plate.

10. A coinjection molding apparatus as claimed in claim 8, wherein the tip retaining piece is made of a material that is less thermally conductive than a material of which the nozzle tip is made.

11. A coinjection molding apparatus as claimed in claim 1, wherein the sleeve comprises a lateral opening between the second manifold melt channel and the inner melt channel, the lateral opening allowing melt to flow from the second manifold melt channel to the inner melt channel, and wherein the pin further comprises a shut-off portion of an outer diameter substantially equal to an inner diameter of the sleeve at the lateral opening, the shut-off portion obstructing the lateral opening when the pin is in the closed position.

12. A coinjection molding apparatus as claimed in claim 1, wherein the outer and inner melt channels have substantially annular cross-sections.

13. A coinjection molding apparatus as claimed in claim 1, wherein the pin further comprises at least a fin that contacts an inner wall of the hollow section of the sleeve to align the pin within the sleeve.

14. A coinjection molding apparatus as claimed in claim 1, wherein the manifold or the nozzle further comprises an electric heater.

15. A coinjection molding apparatus as claimed in claim 1 further comprising a first actuator comprising a piston coupled to the sleeve and a second actuator comprising a piston coupled to the pin.

16. A coinjection molding apparatus as claimed in claim 15 further comprising a yoke plate to which the sleeve and the piston of the first actuator are attached, wherein a body of the first actuator is fixed to a backing plate.

17. A coinjection molding apparatus as claimed in claim 16, wherein a body of the second actuator is attached to the yoke plate and moves with the yoke plate.

18. A coinjection molding apparatus comprising:

a moveable yoke plate;

an actuator comprising a body fixed to the yoke plate and a moveable piston disposed in the body;

a manifold comprising a first manifold melt channel, a second manifold melt channel, and a guide bore;

a nozzle body comprising a longitudinal bore, the nozzle body coupled to the manifold;

a sleeve disposed within the longitudinal bore, the sleeve comprising a tip portion having an opening, and the sleeve having a hollow section and a section narrower than the longitudinal bore thus defining an annular outer melt channel between the sleeve and the nozzle body, the outer melt channel communicating with the first manifold melt channel, the sleeve connected to the yoke plate and movable through the guide bore to open and close melt communication of the outer melt channel to a cavity gate by the tip portion of the sleeve;

a pin disposed within the hollow section of the sleeve and comprising a tip, the pin having a section narrower than the hollow section of the sleeve thus defining an annular inner melt channel between the pin and the sleeve, the inner melt channel for communicating with the second manifold melt channel, the pin connected to the piston of the actuator to open and close melt communication of the inner melt channel to the opening of the sleeve with the tip of the pin, wherein the pin further comprises at least a fin that contacts an inner wall of the hollow section of the sleeve to align the tip of the pin by the opening of the sleeve;

a nozzle tip coupled to the nozzle body and comprising a nozzle tip melt channel in communication with the longitudinal bore and forming part of the outer melt channel, the nozzle tip further comprising an alignment portion having an alignment bore through which the sleeve slides, the alignment bore aligning the tip portion of the sleeve with the cavity gate along the sliding range of the sleeve, wherein the nozzle tip further comprises a release melt channel upstream of the alignment bore, the release melt channel communicating with the nozzle tip melt channel and an annular melt channel that circumferentially surrounds a portion of the nozzle tip downstream of the release melt channel; and a tip retaining piece connected to the nozzle body and retaining the nozzle tip with respect to the nozzle body.

19. A coinjection molding apparatus as claimed in claim 1, wherein the sleeve comprises a lateral opening between the second manifold melt channel and the inner melt channel, the lateral opening for allowing melt to flow from the second manifold melt channel to the inner melt channel, and wherein the pin further comprises a shut-off portion of an outer diameter substantially equal to an inner diameter of the sleeve at the lateral opening, the shut-off portion obstructing the lateral opening when the pin is in the closed position.

20. A coinjection molding apparatus comprising:

a manifold comprising a first manifold melt channel, a second manifold melt channel, and a guide bore;

a nozzle body comprising a longitudinal bore aligned with the guide bore, the nozzle body coupled to the manifold;

a sleeve disposed within the longitudinal bore, the sleeve comprising a tip portion comprising an opening, and the sleeve having a hollow section and a section narrower than the longitudinal bore thus defining an outer melt channel between the sleeve and the nozzle body, the outer melt channel communicating with the first manifold melt channel, the sleeve slidably disposed in the guide bore to open and close melt communication of the outer melt channel to a cavity gate by the tip portion of the sleeve;

means for sliding the sleeve;

a pin disposed within the hollow section of the sleeve and comprising a tip, the pin having a section narrower than the hollow section of the sleeve thus defining an inner melt channel between the pin and the sleeve, the inner melt channel for communicating with the second manifold melt channel, the pin slidably disposed in the sleeve to open and close melt communication of the inner melt channel to the opening of the sleeve by the tip of the pin;

means for sliding the pin; and a nozzle tip coupled to the nozzle body and comprising a nozzle tip melt channel in communication with the longitudinal bore and forming part of the outer melt channel, the nozzle tip further comprising a means for aligning the tip portion of sleeve with the cavity gate.

21. A hot-runner nozzle for a coinjection molding apparatus, comprising:

a nozzle body having a longitudinal bore;

a sleeve comprising a tip portion having an opening therein, the sleeve being slidably disposed within the longitudinal bore;

an outer melt channel located between the sleeve and the nozzle body;

a pin comprising a tip, the pin being slidably disposed within the sleeve;

an inner melt channel located between the pin and the sleeve; and a nozzle tip coupled to the nozzle body and comprising an alignment portion that aligns the tip portion of the sleeve with a cavity gate over a sliding range of the sleeve;

wherein the sliding range of the sleeve is between opened and closed positions in which the tip portion controls melt communication of the outer melt channel and the cavity gate, wherein in the closed position the tip portion of the sleeve engages the cavity gate;

wherein the pin is slidable between opened and closed positions in which the tip controls melt communication of the inner melt channel and the opening of the sleeve.

22. A hot-runner nozzle as claimed in claim 21, wherein the alignment portion comprises an alignment bore through which the sleeve slides.

23. A hot-runner nozzle as claimed in claim 22, wherein an inside surface of the alignment bore comprises a friction-reducing coating or a wear-resistant coating.

24. A hot-runner nozzle as claimed in claim 21 further comprising a tip retaining piece connected to the nozzle body and retaining the nozzle tip with respect to the nozzle body.

25. A hot-runner nozzle as claimed in claim 21, wherein the outer and inner melt channels have substantially annular cross-sections.

26. A hot-runner nozzle as claimed in claim 21, wherein the pin further comprises at least a fin that contacts an inner wall of the sleeve to align the tip of the pin with the opening of the sleeve.

27. A hot-runner nozzle as claimed in claim 21, wherein the nozzle tip further comprises a lateral release melt channel between the outer melt channel and the cavity gate.

28. A hot-runner nozzle as claimed in claim 27, wherein the lateral release melt channel is located upstream of the alignment portion, the lateral release melt channel communicating between the outer melt channel and an annular melt channel that circumferentially surrounds a portion of the nozzle tip downstream of the lateral release melt channel.

* * * * *

UNITED STATES PATENT AND TRADEMARK OFFICE
CERTIFICATE OF CORRECTION

PATENT NO. : 7,527,490 B2  Page 1 of 1
APPLICATION NO. : 11/549365
DATED : May 5, 2009
INVENTOR(S) : Fairy It is certified that error appears in the above-identified patent and that said Letters Patent is hereby corrected as shown below:

Claim 19, col. 11, line 5, please delete "claim 1" and substitute therefore -- claim 18 --.

Signed and Sealed this

Eighteenth Day of August, 2009

David J. Kappos
*Director of the United States Patent and Trademark Office*